United States Patent [19]

Fenton

[11] Patent Number: 4,660,427
[45] Date of Patent: Apr. 28, 1987

[54] CONTINUOUSLY VARIABLE TRANSMISSION

[76] Inventor: John W. Fenton, 26 Shoreland Dr., Key Largo, Fla. 33037

[21] Appl. No.: 661,135

[22] Filed: Oct. 15, 1984

[51] Int. Cl.$^4$ ............................ F16H 21/12; F16H 1/28
[52] U.S. Cl. ............................................ 74/63; 74/805
[58] Field of Search ................. 74/63, 117, 119, 123, 74/124, 805, 640, 793, 796, 417, 750 R

[56] References Cited

U.S. PATENT DOCUMENTS

| | | | |
|---|---|---|---|
| 1,832,383 | 11/1931 | Hall | 74/117 |
| 1,872,636 | 8/1932 | Greening et al. | 74/63 |
| 2,734,397 | 2/1956 | Bade | 74/796 |
| 2,747,434 | 5/1956 | Bade | 74/796 |
| 3,420,113 | 1/1969 | Tauscher | 74/63 |
| 3,621,724 | 11/1971 | Vaughan | 74/63 |
| 3,750,485 | 8/1973 | Blakemore | 74/63 |

FOREIGN PATENT DOCUMENTS 595755  3/1934  Fed. Rep. of Germany ........ 74/119

*Primary Examiner*—Allan D. Herrmann
*Assistant Examiner*—David Novais
*Attorney, Agent, or Firm*—Dunlap, Codding & Peterson

[57] ABSTRACT

A continuously variable transmission comprising a plurality of spokes extending radially from a spoke shaft upon which the spokes are mounted for circular movement about the spoke shaft. A driven ring is positioned relative to the spoke shaft to be engaged by one end of each spoke each time a spoke aligns with a selected direction from the spoke shaft so that movement of the spokes about the spoke shaft will rotate the driven ring by consecutive engagement of the spokes with the driven ring. The spokes are moved circularly about the spoke shaft by a rotating driving ring that extends about the spoke shaft and has a plurality of equally spaced apertures formed radially therethrough to pass the spokes through the driving ring. The driving ring is supported for sliding movement parallel to the selected direction of extension of the spokes for which the spokes engage the driven ring to vary the gear ratio of the transmission.

17 Claims, 10 Drawing Figures

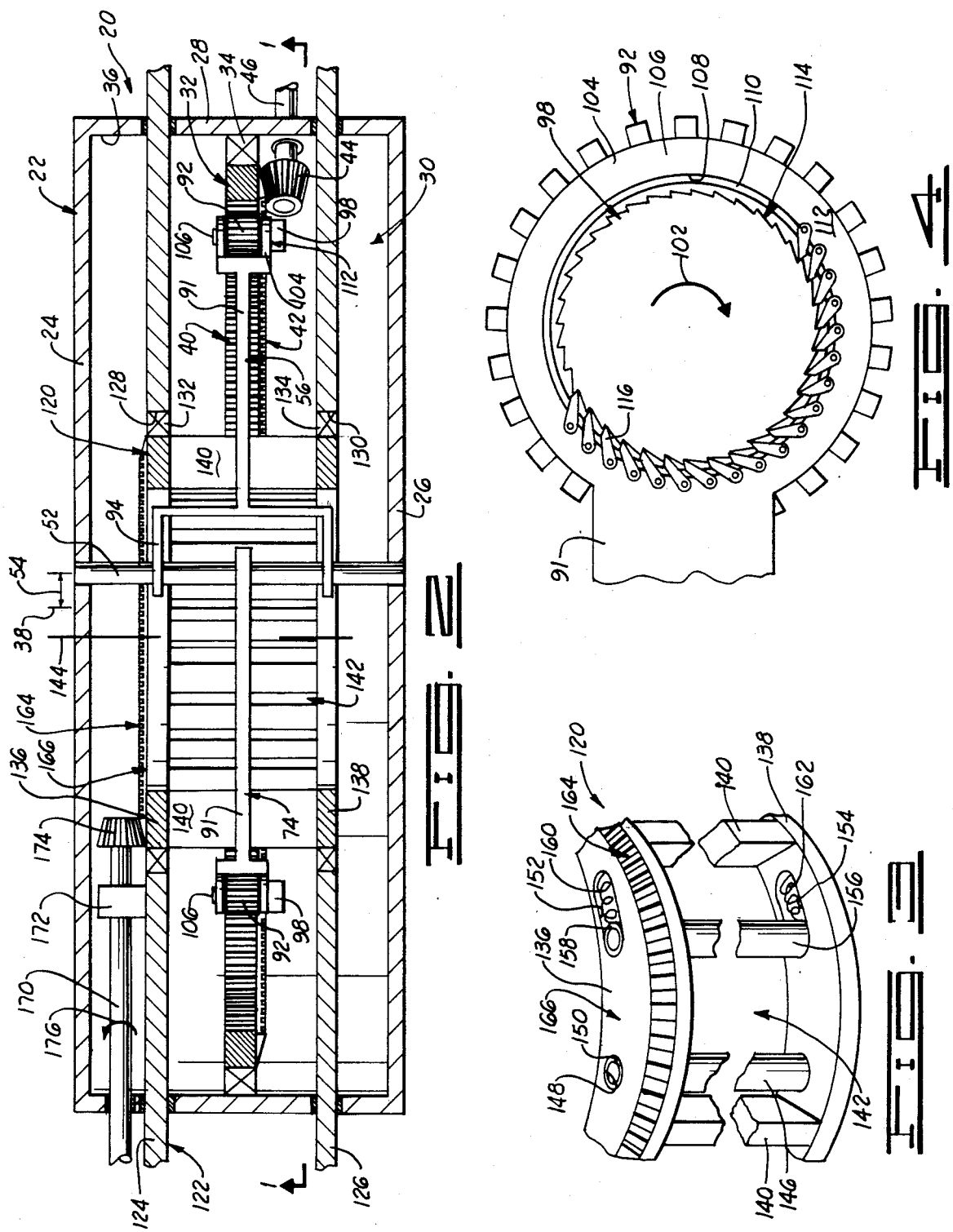

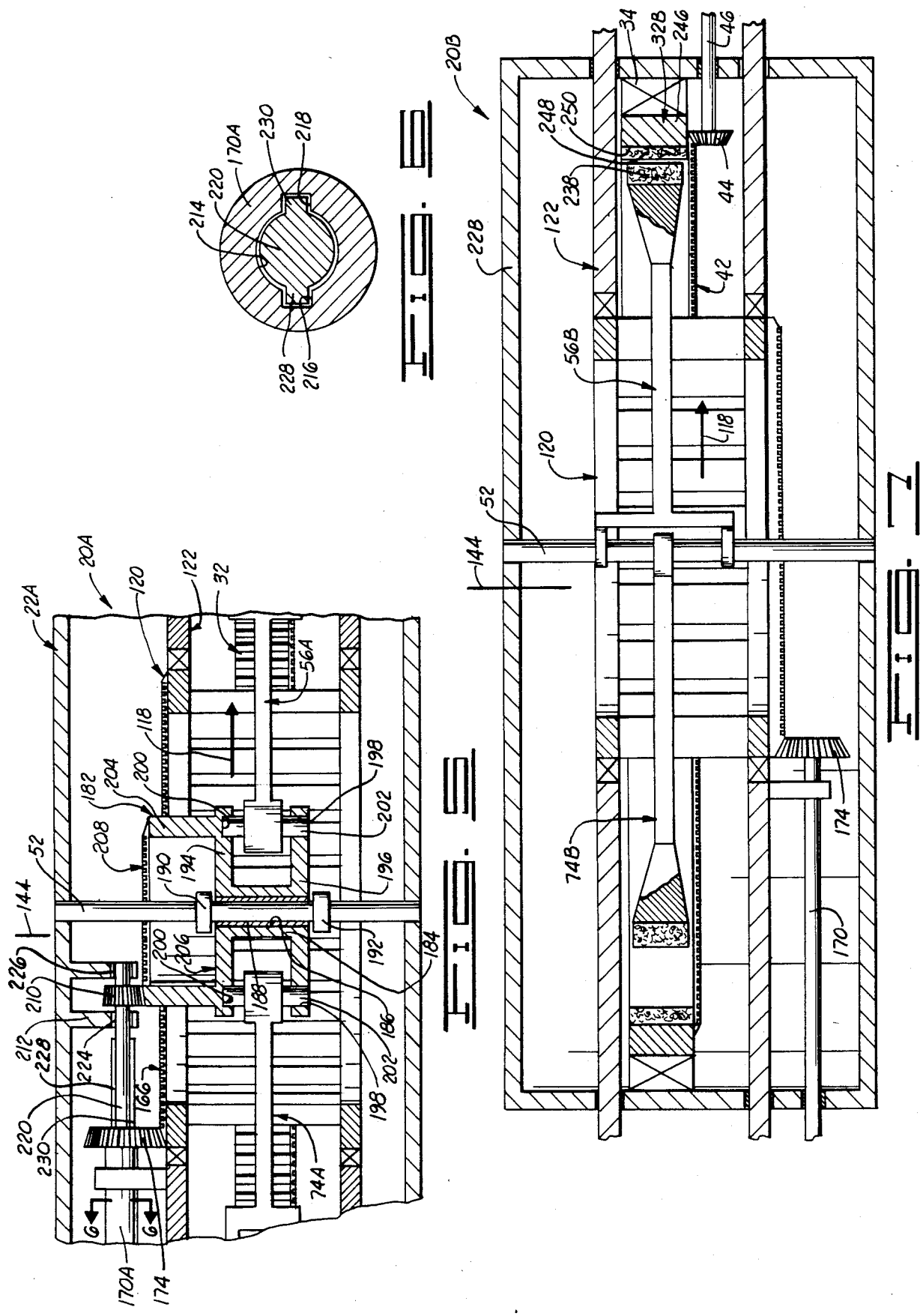

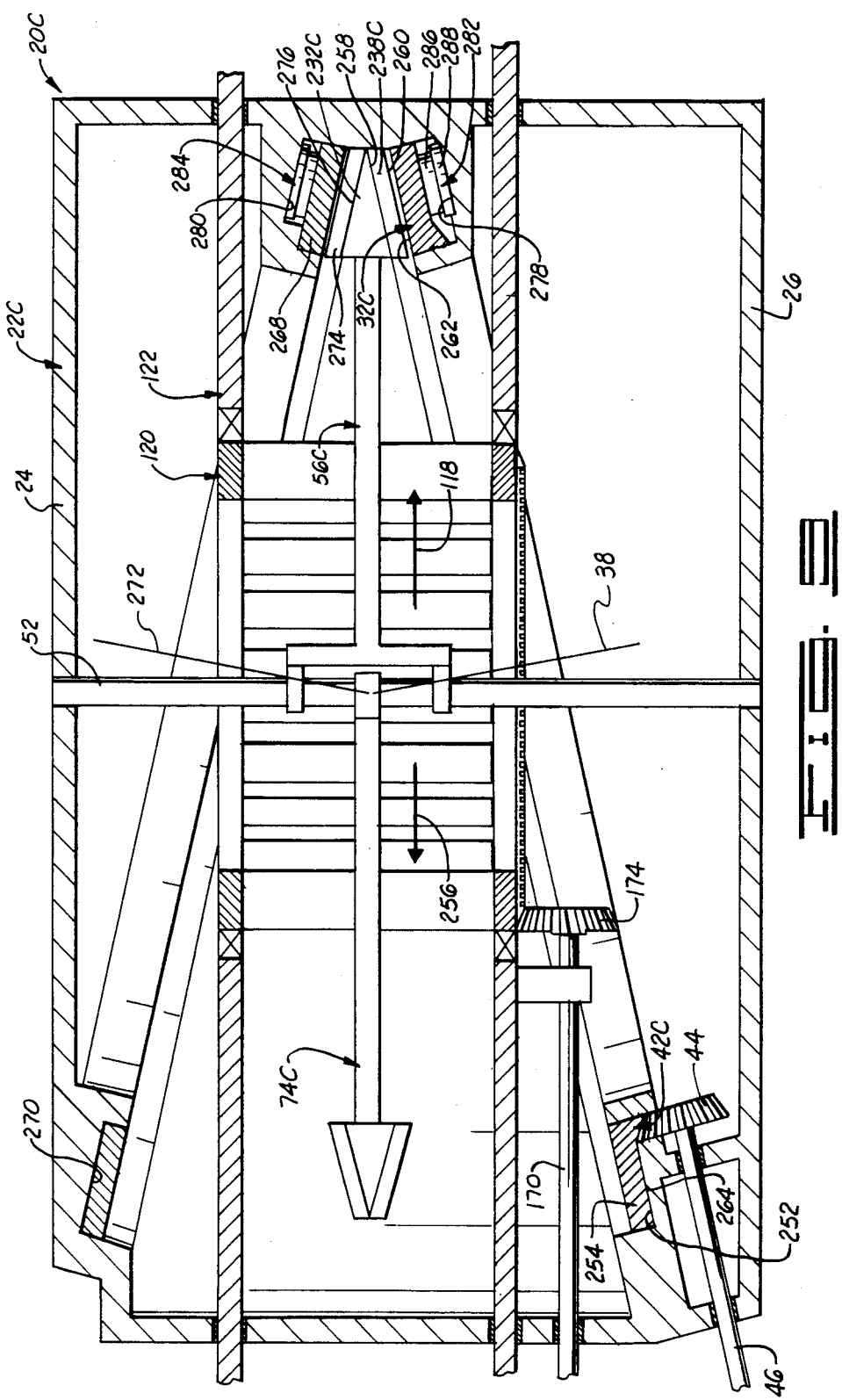

CONTINUOUSLY VARIABLE TRANSMISSION

BACKGROUND OF THE INVENTION

1. Field of the Invention

The present invention relates generally to improvements in mechanical transmissions and, more particularly, but not by way of limitation, to improvements in continuously variable transmissions that provide a range of output speeds for a fixed input speed.

2. Description of the prior art

It has long been known that internal combustion engines will operate most efficiently at a fixed speed which is determined by the characteristics of the particular engine. Thus, considerable savings in energy could be achieved by operating, for example, an automobile engine at constant speed while driving the wheels of the automobile at varying speeds through a transmission that is capable of providing a continuous range of speeds of an output shaft of the transmission for a fixed speed at which an input shaft of the transmission is driven. Because of this possibility of achieving energy savings, continuously variable transmissions have undergone considerable development in recent years.

The common approach that has been taken with prior art continuously variable transmissions has been to provide the transmission with two split sheaves connected together by a belt. One sheave is mounted on an input shaft and the other sheave is mounted on an output shaft for the transmission. The splitting of the sheaves, which is effected on a plane perpendicular to the shaft upon which each sheave is mounted, permits the sides of each sheave to be separated by greater or lesser distances so that the belt that is connecting the sheaves can be caused to engage the sheaves at varying distances from their centers. By coordinately adjusting the separation of the sides of both sheaves, a continuous range of output shaft speed to input shaft speed can be effected.

While prior art transmissions based on this approach have proven useful for many applications, they suffer from several drawbacks. In general, since the two sheaves are connected by a belt, such a transmission can be bulky so that it is not suitable for some applications. Similarly, the adjustment of the speed ratio of the two shafts requires coordination of the adjustment of the separation of halves of sheaves while the sheaves are rotating and, further, the coordination of the adjustments to these sheaves-half separations must be relatively precise if slippage of the belt is not to occur. The mechanisms required to make such precise adjustments to moving parts with the requisite degree of coordination of the adjustments can be relatively expensive.

SUMMARY OF THE INVENTION

The present invention provides a continuously variable transmission that can be compactly constructed and for which coordination of moving parts involved in the adjustment of the relative speeds of the input and output shafts is an inherent feature of the construction of the transmission. Further, the transmission is made up of parts that can be readily mass produced to limit the cost of construction of the transmission.

To these ends, the transmission of the present invention is comprised of a case which supports a driven ring for rotation about the axis of the driven ring. A spoke shaft is mounted on the case to pass through central portions of the driven ring and a plurality of spokes are pivotally mounted on the spoke shaft to extend radially therefrom for circular movement about the spoke shaft. The spoke shaft is positioned with respect to the axis of the driven ring and the lengths of the spokes are selected so that the spokes will engage the driven ring only when the spokes extend in a selected direction from the spoke shaft. The spokes are then rotated about the spoke shaft, to rotate the driven ring, by a driving ring that extends about the spoke shaft and has apertures formed therethrough to permit the spokes to pass through the driving ring. The driving ring is shiftable along a line parallel to the selected direction in which the spokes engage the driven ring so that the engagement between the driving ring and the spokes, relative to the center of rotation of the spokes, can be varied by a lateral movement of the driving ring relative to the case. Such variation results in a variation in the speed of the end of each spoke about the spoke shaft when the spoke extends in the direction to engage the driven ring so that the positioning of the driving ring on the case determines the rate at which the driven ring will be rotated by the spokes for a given rate of rotation of the driving ring. The input shaft of the transmission is then mechanically coupled to the driving ring while the ouput shaft thereof is mechanically coupled to the driven ring. Since the spokes pass through the driven ring, the relative locations on the spokes at which the spokes are engaged by the driving ring occurs in coordination for all spokes when a change in the position of the driving ring is made.

An important object of the present invention is to provide a continuously variable transmission which eliminates the need for a separate mechanism to coordinate the movement of parts of the transmission by means of which a variation in the ratio of the speeds of rotation of the input and output shaft of the transmission is effected.

Another object of the invention is to provide a continuously variable transmission with a compactness that will enable the transmission to be used in circumstances in which a bulky transmission would not be suitable.

A further object of the invention is to provide a continuously variable transmission constructed of parts that can be inexpensively mass produced to effect cost savings in the manufacture of the transmission.

Other objects, advantages and features of the present invention will become clear from the following detailed description of the preferred embodiment of the invention when read in conjunction with the drawings and appended claims.

BRIEF DESCRIPTION OF THE DRAWINGS

FIG. 2 is a cross-section of the transmission shown in FIG. 1 taken along line 2—2 of FIG. 1.

FIG. 3 is a fragmentary isometric view on an enlarged scale of a portion of the driving ring of the continuously variable transmission shown in FIGS. 1 and 2.

FIG. 4 is a side elevational view of a ratchet mechanism used in the continuously variable transmission shown in FIGS. 1 and 2.

FIG. 5 is a fragmentary plan view in cross-section of central portions of a continuously variable transmission constructed in accordance with the present invention illustrating a modification of the mounting of spokes on the spoke shaft of the transmisson.

FIG. 6 is a cross-section of the input shaft of the transmission of FIG. 5 taken along line 6—6 of FIG. 5.

FIG. 7 is a plan view in cross-section of a second embodiment of a continuously variable transmission constructed in accordance with the present invention.

FIG. 8 is an isometric view of a spoke used in the continuously variable transmission shown in FIG. 7.

DESCRIPTION OF FIGS. 1 THROUGH 4

Figure 1:
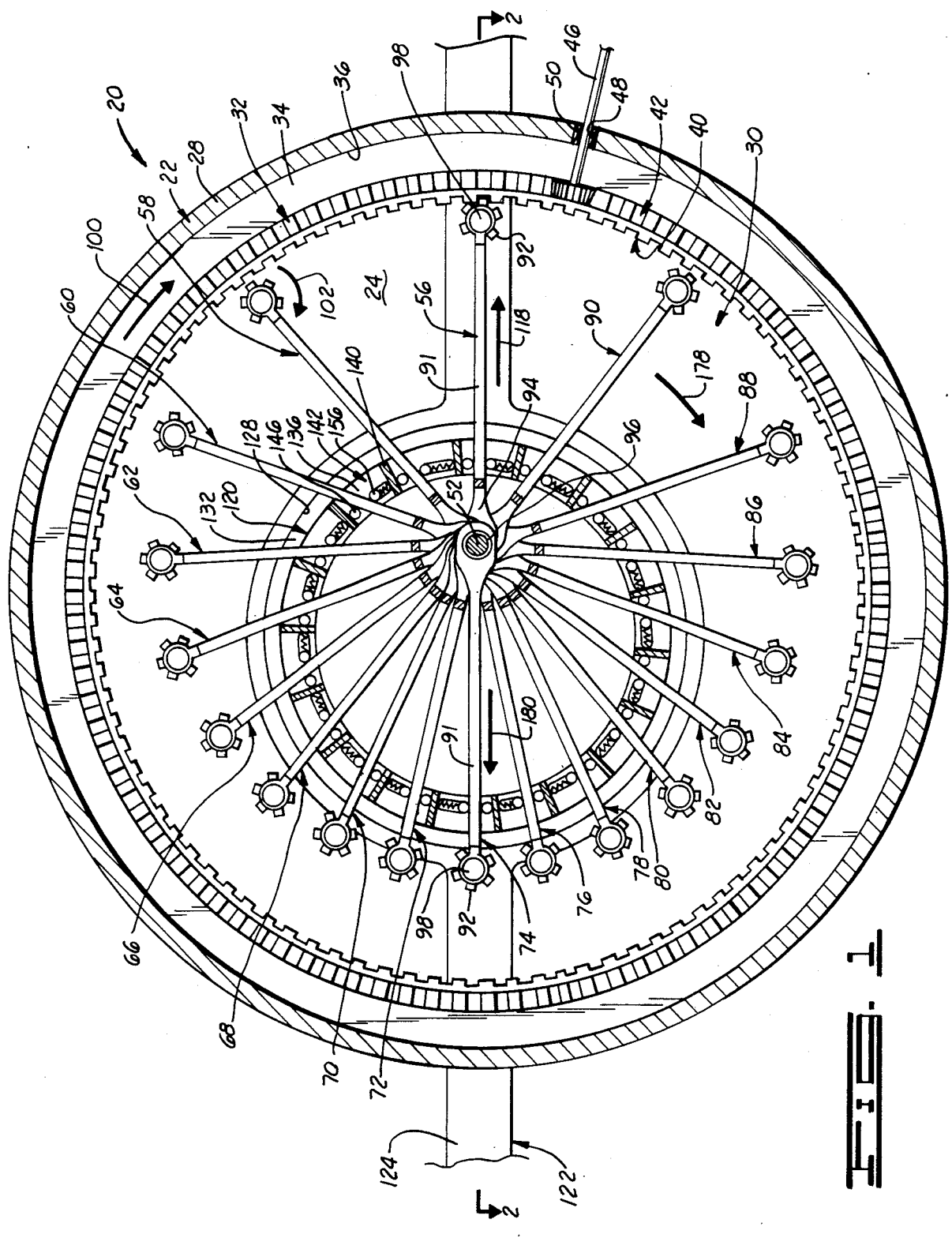
FIG. 1 is a cross-section in side elevation of one preferred embodiment of a continuously variable transmission constructed in accordance with the present invention and taken along line 1—1 of FIG. 2.

Referring now to the drawings in general and to FIGS. 1 and 2 in particular, shown therein and designated by the general reference numeral 20 is a continuously variable transmission constructed in accordance with the present invention. As shown in these figures, the transmission 20 is comprised of a case 22 which has the general form of a circular box and contains remaining portions of the transmission 20. In particular, the case 22 is made up of circular end wall portions 24 and 26, that are disposed in a spaced apart parallel relation and a tubular central wall portion that extends between the portions 24 and 26 to define a flat, circular chamber 30 in which the major portions of the transmission 20 are located. (In order to simplify the drawings and to more clearly bring out the inventive aspects of the transmission 20, the details of the construction of the case 22 have not been illustrated. It will be recognized by those skilled in the art that the case 22 would be constructed in parts and bolted together to permit mounting of remaining portions of the transmission 20 thereon in a manner to be described below. Such piecewise construction and assembly is conventional and need not be discussed for purposes of the present disclosure.)

A driven ring 32 is mounted on the central wall portion 28 via a bearing 34 that extends circumferentially along the inner periphery 36 of the central wall portion 28 substantially midway between the end wall portions 24 and 26 as can be seen in FIG. 2. By means of the mounting of the driven ring 32 via the bearing 34, the driven ring 32 is mounted on the case 22 for rotation about a driven ring axis 38 (FIG. 2) which coincides both with the circular axis of the driven ring 32 and the cylindrical symmetry axis of the case 22. In the continuously variable transmission 20, the driven ring 32 is provided with gear teeth, indicated at 40 in FIGS. 1 and 2, that extend along the inner circular periphery of the driven ring 32 parallel to the driven ring axis 38. Additionally, gear teeth, indicated at 42 in the drawings, are formed along one side of the driven ring 32 to extend radially from the driven ring axis 38. The gear teeth 42 mesh with a bevel gear 44 that is mounted on a shaft 46 that passes through a hole 48 (FIG. 1) formed through the central wall portion 28 of the case 22. A bearing 50 is provided to support the shaft 46 for rotation in the hole 48 and the shaft 46 forms an output shaft for the transmission 20 by means of which mechanical energy is delivered from the transmission 20.

A spoke shaft 52 is mounted within the case 22 to extend through central portions of the chamber 30 parallel to, but not coincident with, the driven ring axis 38. In particular, the shaft 52 is displaced from the driven ring axis 38 by a pre-selected distance 54 for a purpose that will become clear below.

The spoke shaft 52 is circular in cross-section to pivotally support a plurality of spokes 56–90 that extend radially away from the spoke shaft 52 toward the gear teeth 40 on the inner periphery of the driven ring 32. (For clarity of illustration, only two of the spokes; that is, spokes 56 and 74, have been illustrated in FIG. 2.) In the embodiment of the invention shown, 18 spokes have been illustrated. However, it will be clear to those skilled in the art that a greater or lesser number of spokes could be provided a transmission constructed in accordance with the present invention.

Each of the spokes 56–90 is comprised of a rod portion 91, that is mounted on the spoke shaft 52 and extends away therefrom within the driven ring 32, and a spur gear 92 that is mounted on the radially extensive end of the rod portion 90. The gear teeth formed on the spur gears 92 are shaped to mate with the gear teeth 40 formed on the inner circular periphery of the driven ring 32. In order to mount all of the spokes 56–90 on the spoke shaft 52, and align the spur gears 92 with the gear teeth 40, the rod portions 91 of all of the spokes 56–90, excepting the spoke 74, are provided with bifurcated portions 94 at their radially innermost ends, as illustrated for the spoke 56 in FIG. 2, and the bifurcated portions 94 are nested about the radially innermost end of the spoke 74 in a manner that can be seen by a comparison of FIGS. 1 and 2. Suitable bearings, such as a bushing 96 shown in FIG. 1 associated with the spoke 74, are provided between the spokes 56–90 and the spoke shaft 52 so that the spokes 56–90 can turn in a circle on the spoke shaft 52 about the radially innermost ends of the spokes 56–90.

In addition to the rod portions 91 and the spur gears 92, each of the spokes 56–90 comprises a ratchet assembly 98 that limits the direction of rotation of the spur gears 92 on the ends of the rod portion 91 of each of the spokes 56–90. In particular, each spur gear 92 is constrained to rotate in the direction of rotation that the driven gear 32 rotates when the transmission 20 is placed in operation. For purposes of example, these directions of rotation have been indicated in FIG. 1 as clockwise rotations shown by the directional arrows 100 and 102 in FIG. 1. (The direction of rotation 102 has been shown only for the spoke 58 in FIG. 1). The preferred construction of the ratchet assembly 98 which will cause such constraint on the motion of the spur gears 92 has been illustrated in FIG. 4. In particular, each of the rod portions 91 has a second bifurcated portion 104 located at the radially extensive end thereof and each of the spur gears 92 has an axle portion 106 that is mounted within the bifurcated portion 104 via holes formed through the bifurcated portion 104, such as the hole 108 shown in FIG. 4, and bearings 110 that are mounted in the holes 108. The axle portion 106 of each spur gear 92 protrudes from one side 112 of the bifurcated portion 104 of the rod portion 90 that is provided with a plurality of asymmetric teeth 114 extending in a circle about the axis (not numerically designated in the drawings) of the axle portion 106 of the spur gear 92. A plurality of pawls 116 (only one pawl has been numerically designated in FIG. 4) are mounted along a circular arc on the side 112 of the rod portion 91 to extend into the teeth 114 and constrain the spur gear 92 to rotate only in the direction 102 that has also been shown on FIG. 4. The pawls 116 can be held in contact with the teeth 114 by centrifugal forces that arise when the spokes 56–90 move along circular paths about the spoke shaft 52 when the transmission 20 is in operation.

The present invention contemplates that the spokes 56–90 will be utilized to rotate the driven ring 32 within the case 22 via engagement of the gear teeth 40 by the teeth of the spur gears 92 and, for this purpose, the spokes 56–90 are constructed to have a length just sufficient for the teeth of the spur gears 92 to be fully engaged with the gear teeth 40 when a spoke extends in a pre-selected direction, as shown by the directional arrow 118 in FIG. 1, from the spoke shaft 52. In particular, the direction 118 is the same direction in which the spoke shaft 52 is displaced from the driven ring axis 38 and the direction in which the spoke 56 has been shown extended from the spoke shaft 52 in FIG. 1. As shown for the remaining spokes 58–90, the spur gears 92 of the spokes 56–90 will be disengaged from the gear teeth 40 on the driven ring 32 at other positions of the spokes 56–90 about the spoke shaft 52. The purpose for limiting the spur gears which can engage the driven ring 32 in this manner will become clear below. For the moment it will suffice to note that the gear teeth 40 and the spur gears 92 are shaped such that the spur gear on one spoke 56–90 will engage the gear teeth 40 slightly before the spur gear 92 on a previously engaged spoke 56–90 becomes disengaged from the gear teeth 40 on the driven ring 32. The freedom of each spur gear 92 to rotate in the direction 102 that permits the spur gears 92 of two consecutively positioned spokes 56–90 to engage the gear teeth 40 and lock with the gear teeth 40 to force the driven gear 32 in the direction 100 even though the spur gears 92 that are engaged with the gear teeth 40 may be moving at slightly different speeds about the spoke shaft 52.

The spokes 56–90 are driven in a circular movement about the spoke shaft 52 by a driving ring 120 that is mounted within the case 22 to extend about the spoke shaft 52 and for lateral movement on the case 22 along a line that parallels the direction 118. In particular, the driving ring 120 is mounted on a driving ring support 122 that is comprised on parallel side plates 124 and 126 having strap-like end portions that are supported by bushings (not numerically designated in the drawings) mounted in holes (not numerically designated in the drawings) formed through the central wall portion 28 of the case 22. As can be seen in FIG. 2, the side plate 124 is mounted on the case 22 to one side of the driven ring 32 and the side plate 126 is mounted on the case 22 to the other side of the driven ring 32 and, as shown for the side plate 124 in FIG. 1, the strap-like end portions of the side plates 124, 126 parallel the direction 118 so that the driving ring support can be shifted on the case 22 in the direction 118 or opposite the direction 118. The central portion of each of the side plates 124, 126 is enlarged and circular holes 128 and 130 are formed through the enlarged central portions of the side plates 124, 126 to rotationally support the driving ring 120 on the driving ring support 122 via bearings 132 and 134 that can be pressed into the holes 128 and 130 and into which portions of the driving ring 120 can be pressed. The holes 128, 130 through the side plates 124, 126 of the driving ring support 122 are disposed about the spoke shaft 52 so that the driving ring 120 is supported for rotational motion about the spoke shaft 52 and concurrent lateral motion parallel to the direction 118 shown in FIG. 1.

The construction of the driving ring 120 has been particularly shown in FIGS. 1 and 3, the latter figure being a fragmentary view of one portion of the driving ring 120. In particular, the driving ring 120 is comprised of annular first and second side members 136 and 138 respectively, that are held in a spaced apart, parallel relation via a plurality of spacers 140 that are attached to the side rings 136 and 138 and extend between the side rings 136, 138. (Only one spacer 140 has been numerically designated in FIG. 1 and only two spacers 140 have been illustrated in FIG. 3. The spacers 140 can be attached to the side rings 136, 138 by any convenient means; for example, by means of bolts, not shown, that pass through the rings 136, 138 to screw into the ends of the spacers 140.) Such construction of the driving ring 120 provides the driving ring with a plurality of apertures that extend radially through the driving ring 120 and one such aperture, designated 142, has been shown in FIG. 3. The spacers 140 are equally spaced in a circle about the driving ring 120 so that the apertures 142 are similarly equally spaced in a circle about the driving ring 120. The number of spacers 140 is selected to be equal to the number of spokes 56–90, so that the number of apertures 142 will also equal the number of spokes 56–90, and each spoke is passed through one of the apertures 142 as has been shown in FIG. 1.

In the operation of the transmission 20 to be described below, the driving ring 120 is moved parallel to the direction 118 to vary the speed of the output shaft 46 so that the axis 144 of the driving ring 120 (see FIG. 2) will usually not be coincident with the axis of the spoke shaft 52. Accordingly, the spokes 56–90, which extend radially from the spoke shaft 52, will usually extend along a radius of the driving ring 120 only when the spoke is aligned with the direction 118 that is shown in FIG. 1. In order to accommodate the non-radial passage of the rod portions 91 of the spokes 56–90 through the apertures 142 of the driving ring 120, the widths of the apertures 142 are made large with respect to the widths of the rod portions 91 and means are provided within the apertures 142 to position the rod portions 91 of the spokes 56–90 within the apertures 142. In particular, such means comprises a thrust rod 146 mounted within each aperture 142 to extend along one side of the aperture 142. As shown in FIG. 1, the thrust rod 146 is disposed in the trailing side of the aperture 142 so that the thrust rod 146 can engage the rod portion 91 of a spoke 56–90 and force the spoke 56–90 to move in a circular path about the spoke shaft 52 when the driving ring 120 is rotated in a manner to be described below. The thrust rod 146 can conveniently be mounted on the driving ring 120 via holes formed through the side members 136, 138 of the driving ring 120, such as the hole 148 in the side member 136 shown in FIG. 3, and bearings 150 that permit the thrust rods 146 to rotate in the driving ring 120 and thereby roll on the rod portion 91 of a spoke 56–90 to limit friction between the thrust rods 146 and the spokes 56–90. The thrust rods 146 are used to transmit a rotational movement from the driving ring 120 to the spokes 56–90 so that rotation of the driving ring 120 will force the spokes 56–90 to move in a circle about the spoke shaft 52. Elongated slots 152 are formed through the side member 136, to align with the side of each aperture 142 opposite the side of the aperture 142 along which the thrust rod in such aperture 142 extends. Elongated slots 154 are formed through the side member 138, one slot 154 aligning with each slot 152, and the driving ring 120 is further provided with a plurality of positioning rods 156, one positioning rod 156 per aperture 142, that are mounted on the driving ring 120 via bearings, such as the bearing 158 shown in FIG. 3, that slide in the slots 152 and 154. Springs 160 and 162 are positioned in the slots 152 and 154 respectively, to urge the spoke positioning rods 156 toward the thrust rods 146 so that the spoke positioning rods 156 will rollingly bear against the rod portions 91 of the spokes 56-90 to maintain the rod portions 90 in firm engagement with the thrust rods 146 without preventing movement of the rod portions 91 within the apertures 142 that is provided to compensate for the usually non-radial alignment of the rod portions 91 with the apertures 142. (For clarity of illustration, the structure of the driving ring 120 to include the thrust rods 146 and spoke positioning rods 156 has not been illustrated in FIG. 2. Rather, the driving ring 120 has been illustrated only as an apertured ring in such figure.)

As shown in FIGS. 2 and 3, canted, radially extending gear teeth 164 are formed along the side 166 of the side member 136 that faces away from the side member 138 to extend in a circle about the radially outermost edge of the side member 136. An input shaft 170 is mounted on the side plate 124 of the driving ring support 122 via a bracket 172 to support a bevel gear 174 that meshes with the gear teeth 164, the mounting of the input shaft 170 via the bracket 172 maintaining the alignment of the bevel gear 174 with the gear teeth 164. The input shaft 170 passes through a hole (not numerically designated in the drawings) in the central wall portion 28 of the case 22 and is supported on the case 22 by a bushing (not numerically designated in the drawings) in which the shaft 170 may slide and rotate, so that the driving ring 120 can be turned by turning the input shaft 170.

OPERATION OF FIGS. 1 THROUGH 4

During operation of the continuously variable transmission 20, the input shaft 170 thereof is rotated in a direction that has been indicated by the directional arrow 176 in FIG. 2, the direction 176 causing the bevel gear 174 to rotate the driving ring 120 on the driving ring support 122 in the direction 178 that has been illustrated in FIG. 1. As can been seen in FIG. 1, the direction 178 is the same as the direction 100 in which the driven ring 32 is to be rotated on the case 22. As the driving ring 120 rotates, the thrust rod 146 in each of the apertures 140 will engage the rod portion 91 of the spoke passing through such aperture to drive the spokes 56-90 about the spoke shaft 52 in the direction 178 that the driving ring 120 is driven about the spoke shaft 52. For most of the movement of each spoke 56-90 about the spoke shaft 52, the spur gear 92 on the end of the spoke 56-90 will be disengaged from the gear teeth 40 on the driven ring 32 so that, for most of the circular movement of each spoke 56-90, no coupling will exist between the spoke 56-90 and the driven ring 32. However, as each spoke 56-90 nears a position in which the spoke extends in the direction 118 from the spoke shaft 52, the spur gear 92 on the end of the spoke will engage the driven ring 32 so that the rotational movement of the driving ring 120 will be transmitted through a spoke to the driven ring 32. As noted above, the teeth on the spur gears 92 and the teeth 40 are sized sufficiently for the teeth of the spur gear 92 on one spoke to come into engagement with the gear teeth 40 before the spur gear 92 on a previously engaged spoke disengages from the teeth 40 so that the assembly of spokes 56-90 will continuously engage the driven ring 32 to provide a continuous coupling between the driving ring 120 and the driven ring 32.

The speed with which the driven ring 32 is driven by such coupling will be the same as the speed of the spur gears 92 in contact therewith about the spoke shaft 52 and such speed is determined both by the speed of rotation of the driving ring 120 and the point along the rod portion 91 of the driven ring-engaged spokes; for example, the spoke 56 in FIG. 1, at which the engaged spoke is contacted by a thrust rod 146. Thus, for example, the speed of the spur gear 92 on the end of the spoke 56 in FIG. 1 is equal to the speed of rotation of the driving ring 120 multiplied by the length of the spoke 56 and divided by the distance between the center of the spoke shaft 52 and the thrust rod 146 that engages the spoke 56. Thus, when the center of the driving ring 120 is positioned in the direction 180, opposite the direction 118, shown in FIG. 1 from the center of the spoke shaft 52, the spur gear 92 on the radially extensive end of the spoke 56 will be moving at a much greater speed than the speed of rotation of the driving ring 120 to cause a corresponding greater speed of rotation of the driven ring 32 relative to the speed of rotation of the driving ring 120. Conversely, should the center of the driving ring 120 be displaced in the direction 118 from the spoke shaft 52, the rod portion 90 of the spoke 56 will be engaged by the thrust rod 146 in the aperture 140 through which the spoke passes at a point near the spur gear 92 on the spoke 56 so that the spur gear 92 on the spoke 56 will move at a speed about the spoke shaft 52 that is very nearly equal to the speed of rotation of the driving ring 120 to cause the driven ring 32 to rotate at nearly the same speed as the driving ring 120. Thus, by moving the driving ring support 122 parallel to the direction 118 in which spokes engaged with the driven ring 32 extend from the spoke shaft 52, the driven ring 32 can be caused to undergo a continuous change in speed for a fixed speed of rotation of the driving ring 120 occasioned by a fixed rate of rotation of the input shaft 170. The engagement of the bevel gear 44 on the end of the output shaft 46 with the gear teeth 42 on the side of the driven ring 32 then provides a corresponding variable rate of rotation for the output shaft 46.

DESCRIPTION OF FIGS. 5 AND 6

FIGS. 5 and 6 illustrate a modification of the continuously variable transmission 20 that simplifies the mounting of the spokes on the spoke shaft 52. With the exception of mechanical elements that have been included in the continuously variable transmission illustrated in FIGS. 5 and 6 to effectuate this simplification, such transmission is identical to the continuously variable transmission 20 illustrated in FIGS. 1 through 4. Accordingly, the same reference numerals that have been used to identify elements of the continuously variable transmission shown in FIGS. 1 through 4 have been used in FIG. 5 to identify elements of the continuously variable transmission 20 that are carried into the continuously variable transmission shown in FIGS. 5 and 6. Where an element shown in FIGS. 1 through 4 has a modified form when used in the continuously variable transmission shown in FIGS. 5 and 6, such point will be noted by appending the letter "A" to the reference numeral used to identify the element. Consistently with this convention, the continuously variable transmission shown in FIGS. 5 and 6 will be referred to as the continuously variable transmission 20A.

Like the continuously variable transmission 20, the continuously variable transmission 20A is comprised of a driven ring 32 which is rotationally mounted on a case 22A that supports a spoke shaft 52 that extends through central portions of the driven ring 32 and is displaced in a selected direction 118 from the driven ring axis 144 so that spokes circling about the spoke shaft 52 will engage the driven ring 32 only when the spokes extend in the direction 118 from the spoke shaft 52. Additionally, the continuously variable transmission 20A includes a driving ring 120 that is identical to the driving ring 120 of the continuously variable transmission 20 and is identically supported on a driving ring support 122 that is mounted on the case 22A for lateral shifting of the driving ring 120 parallel to the direction 118.

In the variable transmission 20A, the spokes that are driven by the driving ring 120 to drive the driven ring 32 are constructed identically and such construction has been shown in FIG. 5 for two spokes, 56A and 74A, corresponding to the spokes 56 and 74 in FIG. 2. (The continuously variable transmission 20A will also include a remaining set of spokes, corresponding to the spokes 58–72 and 76–90, that have not been illustrated in FIG. 5 for clarity of illustration. Thus, the array of spokes provided the transmission 20A is the same, except for differences in the construction of the spokes, as the array that is provided the continuously variable transmission 20.) As shown for the spokes 56A and 74A, the spokes of the variable transmission 20A are shorter than the spokes of the continuously variable transmission 20 and are mounted on the spoke shaft 52 via a spoke mounting wheel 182 that is caused to turn in synchronization with the driving wheel 120 in a manner that will be discussed below.

The spoke mounting wheel 182 is comprised of a hub 184 having a central bore 186 so that the hub 184 can be rotatably mounted on the spoke shaft 52 via a suitable bearing such as the bushing 188 shown in FIG. 5. The hub 184 is axially positioned on the spoke shaft 52, to align the spokes 56A and 74A, as well as spokes of the transmission 20A that have not been illustrated, with the driven ring 32 by means of collars 190 and 192 that can be fixed to the spoke shaft 52, for example, by means of set screws (not shown). Circular flanges 194 and 196 extend radially from the ends of the hub 184 to provide for the mounting of the spokes on the spoke mounting wheel 182. In particular, holes 198 are formed through the flange 196 and holes 200 are formed in the side of the flange 194 facing the flange 196 so that the spokes 56A, 74A, and the remaining spokes of the variable transmission 20A, can be mounted on the spoke mounting wheel 182 via pins 202 that extend through bores (not shown) formed through the radially innermost ends of the spokes of the transmission 20A.

A gear ring 204 is formed on the side 206 of the flange 194 that faces away from the flange 196 and the gear ring 204 extends, concentrically with the spoke shaft 52, axially outwardly of the side 166 of the driving ring 120 to terminate in gear teeth 208 on the extensive end of the gear ring 204 to mesh with a bevel gear 210 that is rotatably supported by a bracket 212 formed on the case 22A. (With the exception of the provision of the case 22A with the bracket 212, the case 22A is identical to the case 22.)

In the transmission 20A, the input shaft 170A is provided with an axial bore 214 that has been shown in FIG. 6. The bore 214 is provided with diametrically opposed, axially extending grooves 216 and 218 so that the bore 214 can slidably receive a splined shaft 220 upon which the bevel gear 210 is mounted. The shaft 220 is rotatably supported, via bushings 224 and 226, on the bracket 212 so that the shaft 220 is axially fixed to continuously engage the gear teeth 208 on the spoke mounting wheel 182. Splines 228 and 230 are formed on the surface of the shaft 220 to be received in the grooves, 216 and 218, within the input shaft 170A so that the shaft 220 will turn with the input shaft 170A. The bevel gear 210 that turns the spoke mounting wheel 182 is made smaller than the bevel gear 174 that turns the driving ring 120 in the ratio of the diameters of the spoke mounting wheel 182 and the driving ring 120 so that the spoke mounting wheel 184 will be turned synchronously with the driving ring 120. Thus, the pins 202 are maintained continuously aligned with the radially extending apertures that are formed through the driving ring 120. The operation of the transmission 20A differs from the operation of the transmission 20 only in that the spokes of the transmission 20A pivot on the pins 202 during the operation of the transmission 20A rather than on the spoke shaft 52.

DESCRIPTION OF FIGS. 7 AND 8

FIGS. 7 and 8 illustrate, respectively, a second embodiment 20B of a continuously variable transmission constructed in accordance with the present invention and a spoke 70B (corresponding to the spoke 70 in FIG. 1) of the transmission 20B. Like the continuously variable transmission 20, the transmission 20B includes a case 22B that rotatably supports a driving ring 32B and slidably and rotatably supports a driving ring 120 via a driving ring support 122. The driving ring 120 and driving ring support 122 of the transmission 20B are identical to the driving ring 120 and driving ring support 122 of the transmission 20 and are supported in the case 22B in substantially the same manner that such elements are supported in the case 22 of the transmission 20. (In FIG. 7, the driving ring 120 has been shown inverted from the position thereof shown in the transmission 20, in FIGS. 1 and 2, to illustrate a variation in the coupling of the input shaft 170 to the driving ring 120. As shown in FIG. 7, the input shaft 170 is on the same side of the driven ring 32B as the output shaft 46 to illustrate the flexibility in design of the transmission that can be achieved in the present invention. The case 22B differs from the case 22 only in the repositioning of a hole through the case by means of which the input shaft enters the case.) The driving and driven rings, 120 and 32B respectively, are coupled to the input and output shafts, 170 and 46 respectively, via bevel gears, 174 and 44 respectively, in the transmission 20B in the same manner that the driving and driven rings are coupled to the input and output shafts of the transmission 20. Similarly, the spokes, two of which have been illustrated in FIG. 7 and designated by the numerals 56B and 74B therein consistently with the illustration and numbering of the spokes 56 and 74 in FIG. 2, are pivotally mounted on the spoke shaft 52 to extend radially therefrom through the apertures formed radially through the driving ring 120 in the same manner that the spokes 56–90 are mounted on the shaft 52 in the transmission 20 to extend through similar apertures in the driving ring 120 of the transmission 20. However, the form of the spokes of the transmission 20B differ from the form of the spokes used in the transmission 20 and the form of the spokes in the transmission 20B has been illustrated in FIG. 8.

As shown in FIG. 8, the spoke 70B, which is representative of the spokes used in the transmission 20B, comprises a rod portion 91B having a bifurcated portion 94 at the end thereof that is mounted on the spoke shaft 52 so that the spokes of the transmission 20B can be nested together to pivot on the spoke shaft 52 in the same manner that the spokes 56-90 are nested on the spoke shaft 52 of the transmission 20. (As in the case of the transmission 20, the bifurcated portion 94 of the rod portion 91B can be deleted from one of the spokes as illustrated for the spoke 74B in FIG. 7.) The rod portions 91B of the spokes, such as the spokes 70B, of the transmission 20B differ from the rod portions 91 of the spokes 56-90 in that the bifurcated portions 104 of the rod portions 91 are replaced in the spokes, such as the spoke 70B, of the transmission 20B by pad supports 232 at the radially extensive ends of the spokes of the transmission 20B. The pad supports 232 have an enlarged end 234, at the radially outermost end of the rod portion 91B and the pad supports 232 narrow with decreasing radius, from bores 236 that extend about the spoke shaft 52, to mate with remaining portions of the rod portion 91B. The spoke 70B, as well as the remaining spokes of the transmission 20B, further comprises a pad 238 that is adhered to the end 234 of the rod portion 91B. Such pad is constructed of compacted mineral fibers, similar to the compacted mineral fiber construction used in automobile brake shoes, so that a large coefficient of friction will exist between the pad 238 and objects engaged by the pad 238. A curved face 240 is formed on the pad 238 to coincide with the radially outermost end of the spoke 70B, such face 240 being centered on an axis 242 that parallels the axis 244 of the bore 236 but is displaced from the axis 244 by a distance equal to the displacement of the driven ring axis 144 (FIG. 7) from the center of the spoke shaft 52. Since the inner periphery of the driven ring is centered on the driven ring axis 144, the centering of the face 240 on the axis 242 can be utilized to cause the face 240 to mate with the inner periphery of the driven ring 32B by selecting the length of the rod portion 91B so that the face 240 will come into engagement with the driven ring 32B when the spoke 70B extends in the direction 118 from the spoke shaft 52.

Returning to FIG. 7, the driven ring 32B differs from the driven ring 32 consistently with the change that is made in the spokes from the transmission 20 to the transmission 20B. In particular, the gear teeth 40 of the driven ring 32 are deleted in the driven ring 32B to provide for engagement of the driven ring 32B by the pads 238 on the radially extensive ends of the spokes of the transmission 20B. In the preferred construction of the driven ring 32B, such ring is comprised of an annular, metal outer portion 246 that is supported on the case 22B by the bearing 34 and an annular liner 248 that extends about the inner periphery 250 of the outer portion 256 to be engaged by the pads 238. The gear teeth 42 by means of which the driven ring 32B is coupled to the output shaft 46 are formed on the metal outer portion 246 of the driven ring 32B as illustrated in FIG. 7. The transmission 20B operates in the same manner as the transmission 20, differing only in that the coupling between the spokes of the transmission 20B and the driven ring 32B thereof is effected by frictional forces between the pads 238 on the ends of the spokes and the liner 248 of the driven ring 32B.

DESCRIPTION OF FIGS. 9 AND 10

Figure 9:
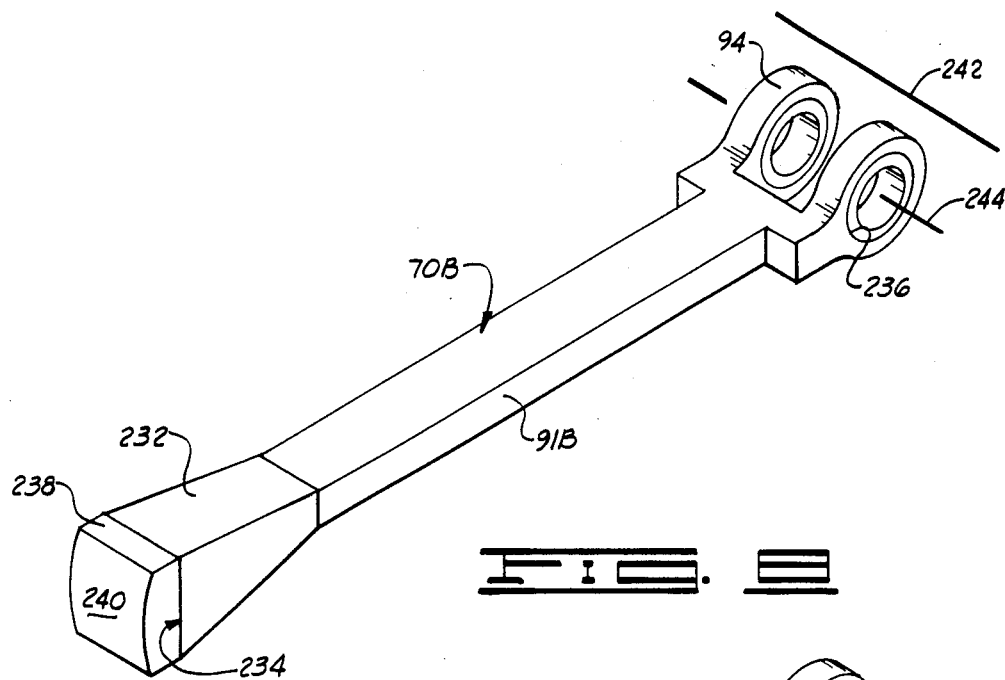
FIG. 9 is a plan view in cross-section of a third embodiment of a continuously variable transmission constructed in accordance with the present invention.
Figure 10:
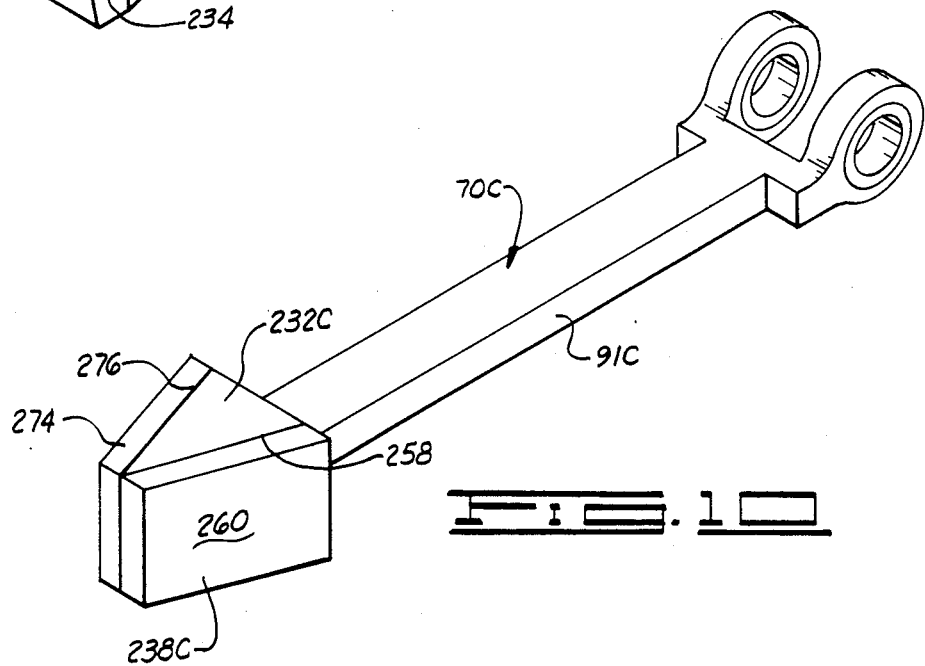
FIG. 10 is an isometric view of a spoke used in the continuously transmission illustrated in FIG. 9.

FIGS. 9 and 10 illustrate, respectively, a third embodiment, designated 20C, of a continuously variable transmission constructed in accordance with the present invention and a representative spoke, designated 70C used in the transmission 20C. As was the case for the spoke 70B, the spoke 70C corresponds to the spoke 70 shown in FIG. 1.

The transmission 20C is comprised of a modified case 22C that supports the driving ring support 122 and input shaft 170 in the same manner that the driving ring support 122 and input shaft 170 are supported by the case 22B of the transmission 20B. The transmission 20C is further comprised of a driven ring 120 and a spoke shaft 52 that are supported and positioned in the same manner that the driving ring 120 and spoke shaft 52 are supported and positioned in the previously described embodiments of the continuously variable transmission of the present invention. Similarly, the spokes of the transmission 20C, two of which have been illustrated in FIG. 9 and designated by the numerals 56C and 74C therein, pass through the apertures formed in the driving ring 120 so that rotation of the driving ring 120 in the manner of the previous embodiments is used to cause the spokes of the transmission 20C to move circularly about the spoke shaft 52.

However, the driven ring 32C is positioned in the transmission 20C in a manner that differs from the positioning of the driven rings of the previously described embodiments to illustrate a different manner of causing the spokes of the transmission 20C to engage the driven ring 32C only when the spokes extend in the selected direction 118 from the spoke shaft 52. In particular, in the transmission 20C, the driven ring 32C is supported in a circular groove 252 formed in the case 22C on an angle to the end wall portions 24, 26 of the case 22C so that the driven ring axis 38 is coplanar with the selected direction 118 and the axis of the spoke shaft 52 but canted with respect to the axis of the spoke shaft 52 as shown in FIG. 9. Thus, portions of the driven ring 32C will move axially of the spoke shaft 32C as they move in a circle in the groove 252 with the result that only portions of the driven ring 32C at the side of the case 22C displaced in the direction 118 from the spoke shaft 52 will be adjacent, and engagable by, the spokes of which the transmission 20C is comprised. Portions of the driven ring 32C displaced in a direction opposite the direction 118 from the spoke shaft 52 will be laterally displaced from the spoke as shown by the portion 254 of the driven ring 32C and the spoke 74C in FIG. 5. Correspondingly, the driven ring 32C can be provided with a radius substantially equal to the lengths of the spokes of the transmission 20C. That is, since the spokes are separated from the driven ring 32 when the spokes extend in the direction 256 shown in FIG. 9 by a lateral displacement of the portion 254 of the driven ring 232C from the spokes, rather than an axial displacement of portions of the driven ring from the ends of the spokes as in the previous embodiments of the invention, no need exists to make the driven ring 32C larger than a circular envelope in which the array of spokes of the continuously variable transmission would be disposed. Thus, the case 22C can be provided with a smaller diameter than the cases of the previously described embodiments to further the object of providing a compact continuously variable transmission.

As in the case of the continuously variable transmission 20B, coupling between the spokes of the transmission 20C and the driven ring 32C is effected by frictional forces and the spokes of the transmission 20C are shaped, as shown in FIG. 10, to effectuate such coupling. As shown in FIG. 10, in which a representative spoke 70C has been illustrated as noted above, the spokes of the transmission 20C comprise rod portions 91C that are substantially identical to the rod portions 91B of the spokes of the transmission 20B. However, the spoke 70C, as well as the remaining spokes of the transmission 20C, differ from the spoke 70B in that the pad support 232C is wedge-shaped rather than having the form of a truncated pyramid as in the case of the pad support 232. Moreover, the pad 238C that is provided on the spoke 70C to engage the driven ring 32C is mounted on one side 258 of the rod portion 91C rather than on the end thereof as in the case of the spoke 70B. As shown in FIG. 9, the construction of the pad support 232C in the form of a wedge enables the lateral surface 260 of the pad 238C to engage a side 262 of the driven ring 32C substantially the width of the side 262. The gear teeth 42C are then formed on the opposite side 264 of the driven ring 32C to be engaged by the bevel gear 44 in the same manner that the gear teeth 40 are engaged by the bevel gear 44 in the transmission 20. (The gear teeth 42C are disposed in a deepened portion, not numerically designated in the drawings, of the groove 252 in which the driven ring 32C is mounted and a cut is formed through portions of the case 22C in which the groove 252 is formed to permit the bevel gear 44 to extend into the groove 252 and mesh with the gear teeth 42C.) The output shaft 46 which carries the bevel gear 44, is supported by bearings (not designated in the drawings) mounted in holes (not numerically designated in the drawings) formed in the case 22C in substantially the same manner that the output shaft 46 is supported in the previously described embodiments of the transmission.

In addition to the elements of the transmission 20C that are also found in the previously described embodiments of the transmission, the transmission 20C further comprises an idler ring 268 that is mounted in a circular groove 270 formed in the case 22C in a mirror image fashion to the groove 252 that supports the driven ring 32C. With the exception of the inclusion of the gear teeth 40C on the driven ring 32C, the driven ring 32C and the idler ring 268 are identical so that the idler ring 268 has an idler ring axis 272, along the circular axis of the idler ring 268, that is equivalent to the driven ring axis 38. Moreover, because of the mirror symmetry between the grooves 252 and 270 in which the driven ring 32C and idler ring 268 are disposed, the idler ring axis 272 will also lie in the plane formed by the direction 118 and the axis of the spoke shaft 52 and will be canted from the spoke shaft 52 in the same manner that the driven ring axis 38 is canted from the spoke shaft 52. Thus, portions of the idler ring 268 in the direction 118 from the spoke shaft 52 will be adjacent the end of the spoke, in the same manner that portions of the driven ring 32C positioned in the direction 118 from the spoke shaft 52 will be adjacent the spoke, while portions of the idler ring 268 positioned in the direction 256 from the spoke shaft 52 will be laterally displaced from the spokes. In the transmission 20C, each spoke is provided with a second pad 274, on the side of the spoke 76 opposite the side 258 thereof, so that the pad 274 will engage the idler ring 268 in the same manner that the pad 238C engages the driven ring 32C. Thus, each time a spoke, such as the spoke 56C shown in FIG. 9, is moved by the driving ring 120 to a position in which the spoke extends in the direction 118 from the spoke shaft 52, the radially outermost portion of the spoke will be positioned to be clamped between a portion of the driven ring 32C and a portion of the idler ring 268, thereby enhancing the frictional coupling between the pad 238C and the driven ring 32C. Such enhancement can be increased by forcing portions of the driven ring 32C and idler ring 268 that engage the pads 238C and 274 into firm engagement with such pads. To this end, sockets 278 and 280 are formed in portions of the grooves, 252 and 270 respectively, at the side of the case 22C displaced in the direction 118 from the spoke rod 52. Spring loaded bearings 282 and 284 can then be positioned in the sockets 278 and 280 to bear against the driven and idler rings, 32C and 268 respectively, to force the rings 32C and 268 into firm engagement with the pads 238C and 274 on the ends of the spokes. The spring loaded bearings 282, 284 can each be constructed in the form of a piston 286 mounted in an open-ended case 288 to be urged therefrom by a belleville spring (not shown) from the case 288 to cause the piston 286 to bear firmly against one of the rings 32C, 268. As in the case of the pads 238 disposed on the ends of the rod portions 91B of the spokes of the transmission 20B, the pads 238C and 274 are preferably constructed of a compacted mineral fiber material similar to the material used in automobile brake shoes to enhance the frictional coupling between the pads 238C and the driven ring 32C and the pads 274 and the idler ring 268. The transmission 20C operates in substantially the same manner as the transmission 20B, the only significant difference being that the driven ring 32C rotates about a driven ring axis 38 that is canted with respect to the spoke shaft 52 rather than a driven ring axis that parallels the spoke shaft 52.

It will be clear that the present invention is well adapted to carry out the objects and attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A continuously variable transmission, comprising:
 a case;
 a driven ring mounted on the case for rotation about a driven ring axis coinciding with the circular axis of the driven ring;
 a spoke shaft mounted on the case to pass through a central portion of the driven ring:
 a plurality of spokes pivotally mounted on the spoke shaft and extending radially therefrom for circular movement about the spoke shaft, wherein the spoke shaft is positioned with respect to the driven ring axis such that the radially extensive end of each spoke will engage the driven ring at such times that the spoke extends in a selected direction from the spoke shaft;
 a driving ring supported in the case to extend about the spoke shaft, the driving ring having a plurality of equally spaced apertures formed radially therethrough for passage of the spokes through the driving ring;

a driving ring support whereon the driving ring is rotatably supported for rotational movement about the spoke shaft, wherein the driving ring support is slidably mounted on the case for movement thereon along a line paralleling said selected direction from the spoke shaft;

an input shaft mounted on the driving ring support and mechanically coupled to the driving ring for rotating the driving ring about the spoke shaft on the driving ring support; and an output shaft mounted on the case and mechanically coupled to the driven ring for rotation of the output shaft by the driven ring.

2. The transmission of claim 1 wherein the driven ring is characterized as having gear teeth paralleling the driven ring axis formed on the inner periphery thereof; and wherein each spoke comprises:

a rod portion mounted on the spoke shaft and extending radially therefrom through an aperture formed through the driving ring;

a spur gear mounted on the radially extensive end of the spoke rod portion for rotation thereon about an axis paralleling the gear teeth on the driven ring, the spur gear having teeth formed thereon to mesh with the gear teeth formed on the driven ring; and means for limiting rotational movement of the spur gear to a direction that is the same as the direction of rotation of the driving ring on the driving ring support.

3. The transmission of claim 2 wherein the spur gear is comprised of an axle portion having a plurality of asymmetric teeth formed about the periphery thereof; and wherein the means for limiting rotational movement of the spur gear is comprised of a plurality of pawls pivotally mounted on the spoke rod portion to engage the teeth formed on the periphery of the spur gear axle portion.

4. The transmission of claim 1 further comprising:

a spoke mounting wheel rotationally mounted on the spoke shaft and pivotally supporting the radially innermost ends of the spokes; and means for rotating the spoke mounting wheel on the spoke in synchronization with the rotation of the driving ring about the spoke shaft.

5. The transmission of claim 1 wherein each spoke comprises:

a rod portion mounted on the spoke shaft and extending radially therefrom through one of said apertures formed through the driving ring; and a pad on the radially extensive end of each spoke to frictionally engage the inner periphery of the driven ring.

6. The transmission of claim 5 wherein said pad is constructed of compacted mineral fibers to enhance the frictional forces between the radially extensive ends of the spokes and the driven ring.

7. The transmission of claim 6 wherein the driven ring comprises:

an annular outer portion constructed of metal and supported by the case for rotation about the driven ring axis; and an annular liner adhered to the inner periphery of the outer portion to extend about the driven ring axis, said liner being constructed of compacted mineral fibers to enhance frictional forces between the spokes and the driven ring.

8. The transmission of claim 1 wherein the radius of the driven ring is substantially equal to the length of each spoke, wherein the driven ring axis is canted with respect to the spoke shaft; and wherein the driven ring is positioned axially of the spoke shaft so as to be engaged at one side thereof by one side of each spoke at such times that said each spoke extends from the spoke shaft in said selected direction.

9. The transmission of claim 8 wherein each spoke comprises:

a rod portion mounted on the spoke shaft and extending radially therefrom through one of said apertures formed through the driving ring; and a pad mounted on one side of the rod portion at the radially extensive end of the spoke to engage said one side of the driven ring.

10. The transmission of claim 8 further comprising:

an idler ring rotationally mounted on the case to extend and rotate about an idler ring axis coincident with the circular axis of the idler ring, wherein the radius of the idler ring is substantially equal to the length of each spoke, wherein the idler ring is canted with respect to the spoke shaft, and wherein the idler ring is positioned axially of the spoke shaft so as to be engaged at one side thereof by the side of each spoke opposite the side of the spoke that engages the driven ring at such times that said each spoke extends from the spoke shaft in said selected direction; and means for urging the driven and idler rings against said sides of each spoke at such times that said each spoke extends from the spoke shaft in said selected direction; and wherein each spoke further comprises a second pad mounted on the rod portion thereof at the radially extensive end of the spoke and on one other side of the spoke to engage said one side of the idler ring.

11. The transmission of claim 1 wherein the driving ring comprises:

an annular first side member;

an annular second side member, coaxial with the first side member;

a plurality of spacers connecting the side members to define said apertures;

a plurality of thrust rods rotationally mounted at the ends thereof in said side members, each thrust rod disposed in one of said apertures and extending along one side of the aperture;

a plurality of spoke positioning rods rotationally and slidably mounted at the ends thereof in said side members, each spoke positioning rod disposed within one of said apertures and extending along the side thereof opposite the side along which a thrust rod extends; and means for urging each spoke positioning rod in an aperture toward the thrust rod in the aperture.

12. The transmission of claim 2 further comprising:

a spoke mounting wheel rotationally mounted on the spoke shaft and pivotally supporting the radially innermost ends of the spokes; and means for rotating the spoke mounting wheel on the spoke in synchronization with the rotation of the driving ring about the spoke shaft.

13. The transmission of claim 3 further comprising:

a spoke mounting wheel rotationally mounted on the spoke shaft and pivotally supporting the radially innermost ends of the spokes; and means for rotating the spoke mounting wheel on the spoke in synchronization with the rotation of the driving ring about the spoke shaft.

14. The transmission of claim 11 wherein the driven ring is characterized as having gear teeth paralleling the driven ring axis formed on the inner periphery thereof; and wherein each spoke comprises:
- a rod portion mounted on the spoke shaft and extending radially therefrom through an aperture formed through the driving ring;
- a spur gear mounted on the radially extensive end of the spoke rod portion for rotation thereon about an axis paralleling the gear teeth on the driven ring, the spur gear having teeth formed thereon to mesh with the gear teeth formed on the driven ring; and
- means for limiting rotational movement of the spur gear to a direction that is the same as the direction of rotation of the driving ring on the driving ring support.

15. The transmission of claim 11 wherein the spur gear is comprised of an axle portion having a plurality of asymmetric teeth formed about the periphery thereof; and wherein the means for limiting rotational movement of the spur gear is comprised of a plurality of pawls pivotally mounted on the spoke rod portion to engage the teeth formed on the periphery of the spur gear axle portion.

16. The transmission of claim 14 further comprising:
- a spoke mounting wheel rotationally mounted on the spoke shaft and pivotally supporting the radially innermost ends of the spokes; and
- means for rotating the spoke mounting wheel on the spoke in synchronization with the rotation of the driving ring about the spoke shaft.

17. The transmission of claim 15 further comprising:
- a spoke mounting wheel rotationally mounted on the spoke shaft and pivotally supporting the radially innermost ends of the spokes; and
- means for rotating the spoke mounting wheel on the spoke in synchronization with the rotation of the driving ring about the spoke shaft.

* * * * *